Oct. 2, 1934.   T. LINDENBERG, JR   1,975,279
APPARATUS FOR RECORDING SOUND ON PHOTOGRAPHIC FILMS
Filed July 13, 1932   2 Sheets-Sheet 1
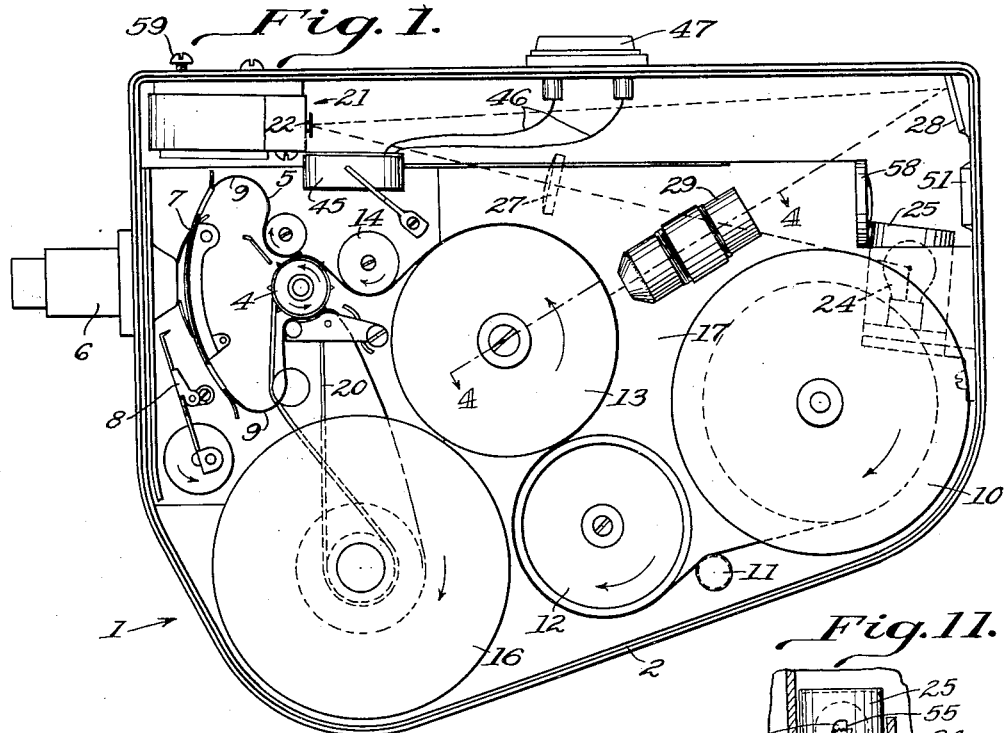
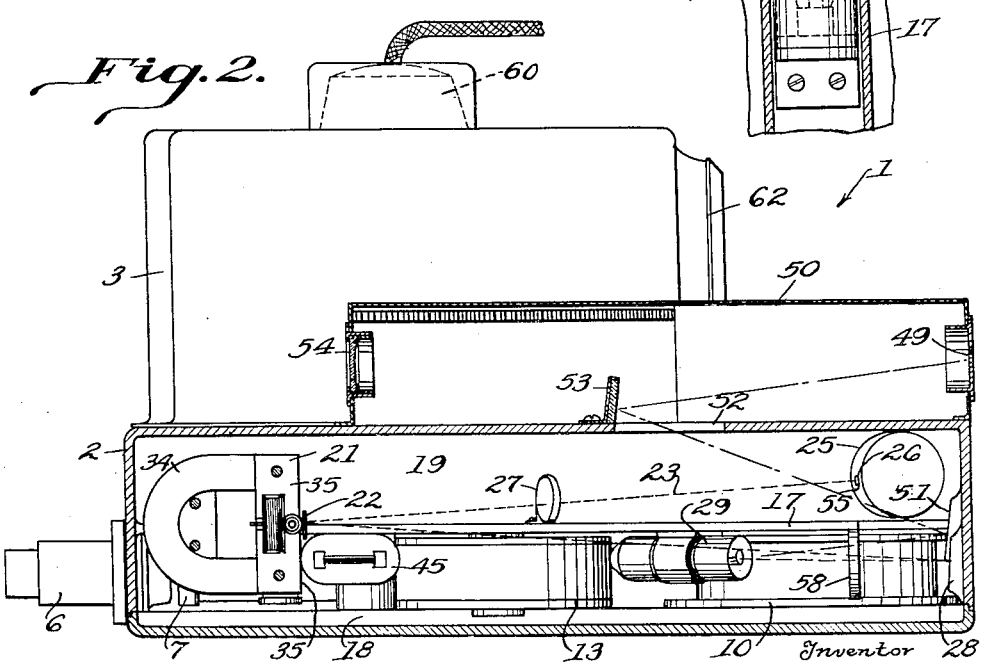
Inventor
T. Lindenberg Jr.
W. S. McDowell Attorney Oct. 2, 1934.   T. LINDENBERG, JR   1,975,279
APPARATUS FOR RECORDING SOUND ON PHOTOGRAPHIC FILMS
Filed July 13, 1932   2 Sheets-Sheet 2

Inventor
T. Lindenberg Jr.
By W. S. McDowell
Attorney

Patented Oct. 2, 1934

1,975,279

UNITED STATES PATENT OFFICE 1,975,279

APPARATUS FOR RECORDING SOUND ON PHOTOGRAPHIC FILMS

Theodore Lindenberg, Jr., Columbus, Ohio

Application July 13, 1932, Serial No. 622,215

5 Claims. (Cl. 179—100.3)

This invention relates to an apparatus for recording sound on photographic film and is more particularly directed to that type of apparatus used in connection with the production of motion picture films wherein the sound is recorded on the film simultaneously with the picture images thereon.

An apparatus of this kind has been disclosed in my prior application filed July 15, 1931, bearing Serial No. 550,893, which apparatus is designed and built of such size that it may be carried much on the order of an ordinary hand camera used by amateurs. Although my prior apparatus gave good results, certain difficulties were present in the recording of the sound in that the film had a tendency to vibrate or flutter at the point of sound recording. This fluttering was found to be due to the jerking of the film caused by the driving sprocket therefor and it is therefore one of the objects of the present invention to overcome this objection and to improve the apparatus to more nearly perfect the recording of sound upon the film.

More specifically, this improvement consists in providing the apparatus with a system of rollers over which the film is trained or passed to effect a steady and uniform movement of the film at the point of recording of the sound. One of the rollers of this system is comparatively heavy and when set in motion has the action of a fly wheel so that the movement of the film passing thereover will be uniform with the result that the sound recorded on the portion of the film passing over the roller will be greatly improved and give more perfect reproduction.

It is also an object to provide in connection with the usual sight of the camera an arrangement of mirrors by which it is possible for the operator to see the oscillating light beam reflected from an electrically controlled vibratory mirror used in this system of recording sound, which system or method is known as the variable area method. This beam which is visible and directed upon the restricted light slit provided in connection with the optical lens structure of the sound recording mechanism may thus be regulated or its limits of oscillation controlled to keep the beam within the sound track formed by the restricted slot and prevent overshooting thereof which would cut out the peaks of the oscillation.

A further object of the invention resides in the provision of a volume control carried directly by the camera which is so situated as to be within easy reach of the operator to regulate the amplification of the sound and the control of the light beam.

A still further object of the invention resides in an improved mounting for the vibratory mirror used in reflecting the light beam which mounting is extremely stable and yet possesses unusual sensitivity in responding to the electrical impulses of the magnetic field of the vibrator.

A still further object of the invention is to design an apparatus of this character so that it will be compact and simplified for use by relatively unskilled operators and to make it particularly adaptable in connection with small hand carried types of cameras, which may be readily transported from one place to another and set up for operation without undue equipment or preparation.

With these and other objects in view, which will appear as the description proceeds, the invention consists in the novel features of construction, combinations of elements and arrangements of parts hereinafter to be more fully described and pointed out in the appended claims.

In the accompanying drawings:

Fig. 1 is a side elevation of the camera with the cover removed therefrom showing the mechanism therein in elevation;

Fig. 2 is a horizontal sectional view taken through the upper portion of the camera and showing more particularly sights for the camera and the path of the oscillatory light beam used in connection with the sound recording mechanism;

Fig. 11 is a sectional view of a lamp and housing shown in Fig. 2.

Figure 3:
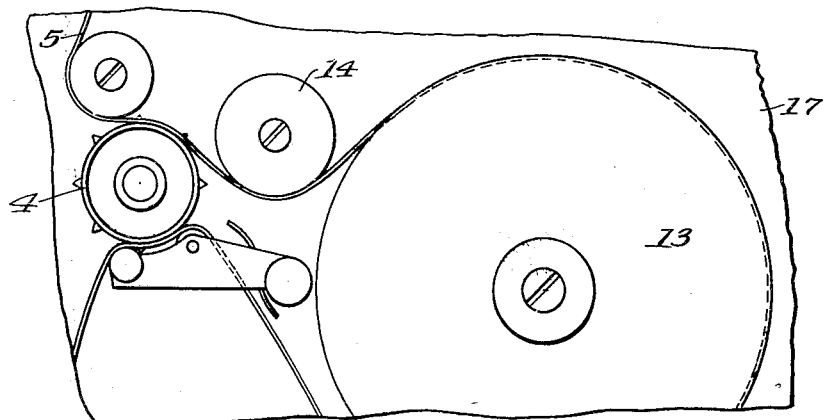
Fig. 3 is an enlarged detail view of the film driving sprocket and related film roll.
Figure 4:
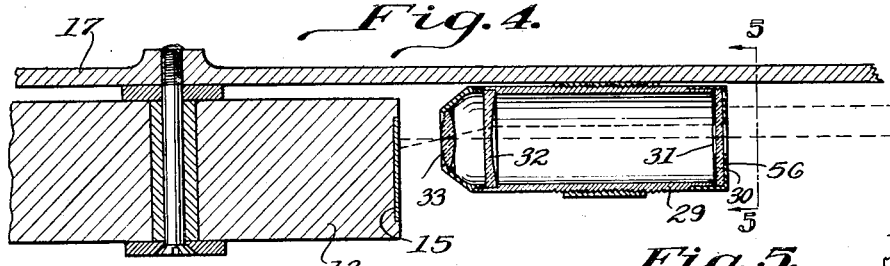
Fig. 4 is a sectional view taken on the line 4—4 of Fig. 1.
Figure 6:
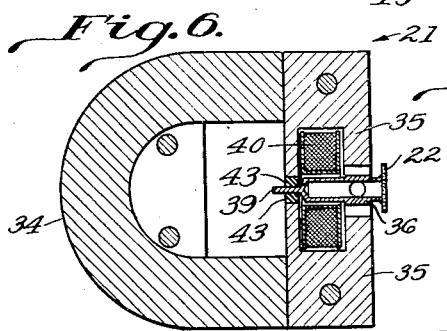
Fig. 6 is a sectional view taken through the vibrator and the mounting for oscillating mirror.

Referring more particularly to the drawings, the numeral 1 designates the apparatus in its entirety which comprises a casing 2 for housing the camera unit and the sound recording mechanism, and a casing 3 for the driving motor (not shown) of the camera and which may be of the spring or electrically operated type. The casings 2 and 3 which in this instance are formed separately and united to one another may of course be formed into a single unit if desired.

Arranged within the casing 2 and positioned near one end thereof is the usual film feeding sprocket 4 which is mounted upon a shaft driven by the motor and over which sprocket, the film 5 is trained to move the same past the lens structure 6 for picture exposure. The film is also trained for passage through guides 7 located to the rear of the lens 6 structure and moved in an intermittent fashion past the lens by the mechanism 8. The arrangement of the film adjacent the guides 7 is also such as to provide upper and lower loops 9 which are constantly maintained during the feeding of the film and which permit of the intermittent movement of the film through the guides 7 while being passed at a constant speed over the sprocket 4.

Although the film is moved uniformly and constant at the sprocket, there is found to be a slight jerking or fluttering of the film at this point due to the fact that the teeth of the sprocket engage the film at spaced intervals. This jerking of the film, although slight, would interfere with the true recording of sound thereon and therefore to overcome this objection, a system of idler rollers or pulleys are provided over which the film is passed and which rollers are arranged between the raw film carrying reel or spool 10 and the driving sprocket 4. These rollers which are designated by the numerals 11, 12, 13 and 14 are positioned closely to one another so that the film which is passed around the rollers takes a tortuous path and is kept taut or in firm frictional engagement therewith throughout its length from the first roller 11 to the last roller 14. The roller 14 is spaced a distance from the sprocket 4 and the roller 13 to provide a space for portions of the film which, due to the slack at these points, will tend to absorb the jerks of the film caused by the sprocket engagement therewith and keep the same from being transmitted to the rollers and particularly the roller 13 upon which the film rests when sound is recorded thereon.

The roller 13 which is made of metal and formed comparatively large, is of considerable weight and acts on the order of a fly wheel to give a smooth and uniform movement to the film in its passage thereover. It will be noted by reference to Fig. 1 that the film 5 engages substantially half of the circumference of this roller and that the roller 12 is arranged in close relation thereto with just enough clearance to permit the film to pass therebetween. This will insure an intimate contact of the film with respect to the roller 13 and prevent possible slippage of the film thereover. Formed in the roller 13 is a shallow groove 15 for the reception of the film which will hold the latter in perfect alignment at all times and prevent side slippage thereof upon the roll. This roller and the rollers 11 and 12 together with the reel 10 and the take-up reel 16 are all mounted upon a removable panel or wall member 17 which divides the casing 2 into front and rear compartments 18 and 19.

It will be seen from the structure so far described, that the film in being moved by the sprocket 4 from the reel 10 to the reel 16, which latter reel is driven by a belt 20 passing over a pulley mounted on the motor shaft, the film is passed over a system of rollers which will put the necessary friction upon the film without resorting to springs and other braking or tensioning devices. In the present arrangement, the reel 10 is free to rotate without tension thereon and the film leading therefrom moves unhindered, but due to the fact that the film is coiled around the rollers transmits movement to the latter which by the momentum thereof will keep the film moving in a smooth and steady manner at the point of sound recording. The smaller roller 11 is so located with respect to the roller 12 and the reel 10 that the film will always be in engagement therewith until the end of the film is reached. This will maintain the film in true relation with respect to the roll 12 and prevent any looseness which would be apt to cause slippage or jerking of the film.

The sound recording mechanism forming a part of this invention is partly located within the compartment 18 and partly within the compartment 19 and includes a magnetic vibrator, designated generally by the numeral 21. This vibrator includes a small oscillating mirror or light reflector 22 upon which a light beam designated by the dotted lines 23 is directed. The source of this light beam is a lamp 24 positioned within a housing 25 having a light aperture 26 formed therein as shown in Fig. 11. The aperture 26 is so located relative to the filament of the lamp that the light beam issuing therefrom will pass through the aperture and to the mirror 22 after first passing through a condensing lens 27 arranged at a point substantially half way between the mirror and the light source. From the mirror 22, the light beam is directed upon a second mirror 28 stationarily positioned and arranged at such an angle as to direct the beam to the lens carrying tube 29 arranged adjacent the film guiding roll 13. The tube 29 has its upper end closed by means of a circular glass plate 30 having its rear silvered surface provided with a very restricted slit or aperture 31 through which the beam of light passes and is directed to a pair of optical lenses 32 and 33 by which the beam is condensed and focused upon the sound recording portion of the film while the latter is moved at a uniform speed therethrough.

Figures 5, 8:
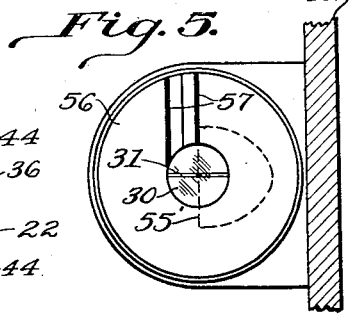
Fig. 5 is a transverse detail sectional view taken on the line 5—5 of Fig. 4.
Fig. 8 is a perspective view of the mirror mounting.
Figure 7:
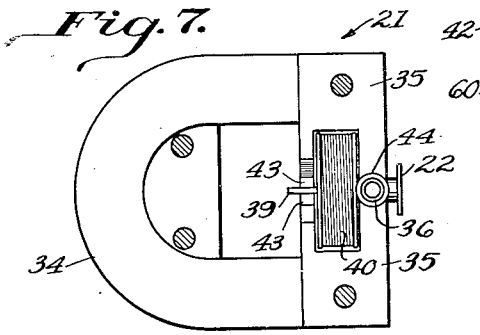
Fig. 7 is a top plan view thereof.
Figures 9, 10:
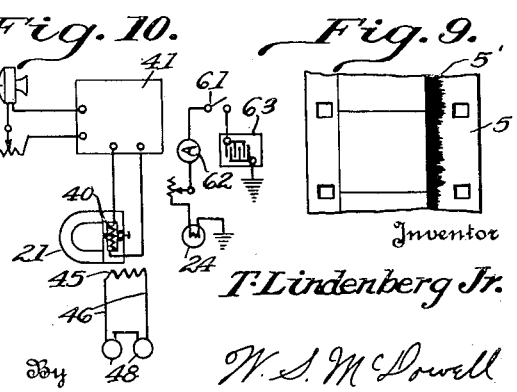
Fig. 9 is a detail view of a portion of the film showing the sound track thereon.
Fig. 10 is a diagrammatic view of the various circuits and controls used in connection with the apparatus.

The vibrating unit 21 carrying the mirror, consists of a permanent magnet 34 to the ends of which are attached a pair of pole pieces 35 between which is positioned a pivoted armature 36. This armature which is particularly illustrated in Fig. 8 is formed to include a pivoting pin 37 positioned within arcuate sockets provided in the pole pieces 35. Arranged transversely and centrally of the pivoting pin 37 is an arm carrying the reflecting mirror 22 at one end and having a thin vane 39 formed with its opposite end which is positioned between the active portions of the pole pieces. The intermediate portion of the arm 38 is arranged within the electrical winding 40 connected in circuit with the amplifier 41 and the microphone 42, diagrammatically indicated in Fig. 10. To prevent over-vibration of the armature, flexible material such as rubber and the like 43 is arranged on each side of the vane 39 and held in clamped relation therewith and to prevent metallic noises from being set up in the mounting, rubber sleeves 44 are positioned upon the pivotal portions of the pin 37. The pole pieces 35 may be so adjusted as to compress the rubber dampening more or less to give the desired vibratory effect of the armature. Particular care has been exercised in the designing of this armature to eliminate undue weight thereof so that the armature will respond more readily to the finer or more delicate vibration of the electrical sound impulses. To this end, the pivoting pin 37 and the arm 38 of the armature is formed tubular and to further reduce the weight thereof, the vane 39 as well as the mirror 22 has been formed very thin to cut down the inertia of the movable parts. The tubular construction of the armature will give the maximum strength thereto with the minimum amount of weight of material.

From the foregoing, it will be seen that as the armature with its attached mirror is rocked or is oscillated to the microphonically controlled impulses, the light beam from the incandescent lamp 24 will be reflected by the mirror 22 to the second mirror 28 which in turn again reflects the beam in a line through the restricted slit 31, through the lenses 32 and 33 and upon the film 5. The mirrors 22 and 28 are so positioned as to normally direct the beam upon only one half of the length of the slit. However, due to the oscillating movement of the mirror, the light beam is caused to take a lateral path lengthwise of the slit and therefore also expose the other half of the slit in proportion to the strength of the sound impulses to produce a serrated edge on the sound track 5' on the film, as is well known in this method of sound recording.

In this as well as in my former patent application, I employ a monitor or induction unit 45 in the magnetic field of the vibrator. This induction unit 45 is a separate coil positioned in the housing 2 and arranged adjacent or in close proximity to the vibrator 21 so as to be within the magnetic field thereof. Extending from the induction unit is a pair of conductors 46 leading to a connection 47 for the attachment of ear phones 48 by which the operator of the camera unit may note the amplitude of the sound current and thereby control the strength of the electric sound impulses used in actuating the oscillating mirror. By the provision of the induction unit 45, it will be possible for the operator to note instantly when any one of the parts, such as the amplifier or the microphone is not functioning properly and to correct any objectionable recording before passing too great a distance through the camera or apparatus.

Although this monitor or induction unit facilitates materially the control of the sound recording mechanism, it has been observed that when the sound to be recorded is close to the camera or other sound is nearby such sound is apt to drown out the signals in the ear phones and, to overcome this objection, a visible control is provided by which the operator may see the light beam and its degree of oscillation upon the light slit while being focused upon the film. To effect this control, an arrangement of mirrors is provided which are visible through the opening 49 formed at one end of the sight scope 50 for the camera. The mirror 51 of this sight control is so located relative to the lens tube 29 that the image of the light slit and beam will be reflected through an opening 52 formed in the side wall of the camera casing and upon a second mirror 53 which is arranged at such angle as to reflect the image at the opening 49. The mirror 53 is so positioned as not to obstruct the sight 54 and therefore does not interfere with the taking of pictures.

To enable the operator to more clearly see the location of the light beam, the lamp housing 25 has its aperture 26 formed with a vertical straight edge 55. This edge will produce a similar straight edge or side on the light beam which will be visible upon the front wall of the tube 29 and arranged vertically and centrally thereof as indicated by dotted lines 55' in Fig. 5. As the light strip 31 is barely visible, the front wall 56 of the tube 29 is provided with vertical lines or graduations 57 of which one thereof is arranged to indicate the center of the light slit and the other one of the outer ends thereof. As the vertical side edge of the beam is of considerable height, the same will extend over the graduations and the point of location thereof will thus be clearly seen as reflected by the mirror to the sight opening 49. If desired a lens 58 may be interposed between the end of the tube and the mirror 51 so as to magnify the beam and the graduations and thereby facilitate the observation thereof.

From the foregoing, it will be seen that by the provision of the sight control improved sound recording will be obtained so that the operator at all times can control or check the movements of the light beam passing through the light slit. With the control, a much finer regulation of the light beam is possible than that by the use of the monitor or sound control by itself as at times undesirable noises around the camera may destroy or interfere with the hearing of the electrical signals in the ear phones. Another advantage derived from this sight arrangement is that the operator may observe the location of the beam to correct the normal position thereof which adjustment is effected by rocking the vibrator by the adjusting screw 59 which is adjustable from the exterior of the camera casing and may be turned by a suitable tool while the operator is observing the degree of adjustment through the sight opening 49.

An outstanding feature of the invention is the positioning of the vibrator unit with its oscillating mirror relative to the stationary mirror and the light slit, in that by this arrangement the apparatus may be formed more compact and smaller in size and thereby more readily handled and carried from one place to another. Another important feature is the arrangement of the volume control 60 on the camera unit so that the same may be within easy reach of the operator at all times at the point of recording. Other controls such as a switch 61 for the lamp 24 may also be provided on the casing if desired. The casing may also carry an ammeter 62 to show the strength of the current leading to the lamp 24. The source of energy for the lamp is a battery 63 which may be arranged near the apparatus and the batteries for the mirror vibrator and the microphone may be carried in connection with the amplifier 41.

While the apparatus described has been particularly designed for use in connection with a sixteen millimeter film, it will be understood that the mechanism may be equally adaptable to the larger films such as those employed in the motion picture industry. It will also be understood that various changes may be made in the apparatus shown and described without departing from the spirit and scope of the invention as set forth in the subjoined claims.

What is claimed is:

1. In a sound recording apparatus, a casing, a driving sprocket over which a film is adapted to pass positioned in said casing, means for guiding and moving the film at a uniform rate of speed including a roller, a member having a light slit therein arranged adjacent the film on said roller, a source of light for producing the light beam, an electrically controlled vibratory mirror for directing the light beam upon said slit, a stationary mirror arranged between said first mirror and light slit, said light source, the vibratory mirror and the stationary mirror being so arranged relative to one another that the light beam will take a zigzag course before directed upon said light slit.

2. In a sound recording apparatus, a casing, means for guiding and moving a film at a uniform rate of speed including a roller, a tubular member having a light slit at one end arranged adjacent the film passing over said roller, an incandescent lamp in said casing, an electrically controlled vibratory mirror positioned in said casing, a stationary mirror arranged in the casing and facing the first mirror and the slit in said tubular member, the lamp and the mirrors being so located as to direct the beam first upon the vibratory mirror and redirect the same upon the stationary mirror when once it is passed through the slit of said tubular member.

3. In apparatus for recording sound on photographic film, a casing, a member having a light slit positioned in said casing, means for moving and guiding a film past said slit, a lamp for producing a light beam, means for effecting the movement of said beam and directing the same upon said slit, means for producing a vertical edge on said beam which edge is normally positioned centrally of said slit, and means comprising a combination sight including a reflecting mirror formed in connection with said casing whereby the location of said edge upon the beam may be observed.

4. In apparatus for recording sound on photographic film, a casing, a member having a light slit at one end arranged in said casing, a source of light, means for directing a beam from said source through said slit, a sight scope communicating with the interior of said casing through an opening therein, a stationary reflecting mirror adjacent said opening, a second stationary reflecting mirror in said casing, a sight in said sight scope through which said beam reflected by said mirrors may be observed for regulation and means for producing a vertical side on said beam which is clearly visible relative to said slit.

5. In a combined motion picture and sound recording camera, the combination of a sprocket for feeding film, a flywheel pulley spaced from said sprocket and having a circumference considerably greater than the circumference of said sprocket and about which pulley the film is adapted to be carried for sound recording, a frictional guiding pulley to maintain the film under tension on said flywheel pulley, and an intermediate pulley interposed between said flywheel pulley and said sprocket, whereby jerking or fluttering of the film is eliminated without auxiliary tensioning means.

THEODORE LINDENBERG, Jr.